(12) United States Patent
Arici et al.

(10) Patent No.: US 8,000,551 B2
(45) Date of Patent: Aug. 16, 2011

(54) METHOD AND APPARATUS FOR ADJUSTING THE CONTRAST OF AN IMAGE

(75) Inventors: Tarik Arici, Istanbul (TR); Huseyin Ozdemir, Istanbul (TR); Yucel Altunbasak, Alpharetta, GA (US)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 1070 days.

(21) Appl. No.: 11/775,553

(22) Filed: Jul. 10, 2007

(65) Prior Publication Data

US 2008/0012992 A1 Jan. 17, 2008

Related U.S. Application Data

(60) Provisional application No. 60/806,963, filed on Jul. 11, 2006.

(51) Int. Cl.
*G06K 9/40* (2006.01)
(52) U.S. Cl. ...................................................... 382/260
(58) Field of Classification Search .................. 382/165, 382/167, 190, 199, 219, 220, 250, 251–252, 382/255–256, 260–266; 348/607, 610, 615, 348/622, 625, 627; 358/3.26, 3.27, 532, 358/537, 540, 463, 464
See application file for complete search history.

(56) References Cited

U.S. PATENT DOCUMENTS

| | | | |
|---|---|---|---|
| 4,231,065 A | 10/1980 | Fitch | |
| 5,771,318 A * | 6/1998 | Fang et al. | 382/261 |
| 5,777,689 A | 7/1998 | Dunbar | |
| 5,880,767 A * | 3/1999 | Liu | 347/251 |
| 5,881,164 A * | 3/1999 | Ichikawa | 382/149 |
| 6,055,340 A * | 4/2000 | Nagao | 382/261 |
| 6,285,798 B1 * | 9/2001 | Lee | 382/260 |
| 6,721,457 B1 | 4/2004 | Atkins | |
| 6,735,330 B1 * | 5/2004 | Van Metter et al. | 382/132 |
| 7,003,173 B2 | 2/2006 | Deshpande | |
| 7,102,697 B2 * | 9/2006 | Lei et al. | 348/678 |
| 7,181,063 B2 * | 2/2007 | Walmsley et al. | 382/162 |
| 7,269,296 B2 * | 9/2007 | Wang et al. | 382/275 |

(Continued)

FOREIGN PATENT DOCUMENTS

EP 1 107 181 A2 6/2001

(Continued)

OTHER PUBLICATIONS

Roman M. Palenichka, Peter Zinterhof, A fast structure-adaptive evaluation of local features in images, Pattern Recognition, vol. 29, Issue 9, Sep. 1996, pp. 1495-1505, ISSN 0031-3203.*

(Continued)

*Primary Examiner* — Gregory M Desire
*Assistant Examiner* — Andrae S Allison
(74) *Attorney, Agent, or Firm* — Conley Rose, P.C.

(57) ABSTRACT

A method and apparatus adjusts the contrast of an input image formed of pixels. Each pixel in the input image has an input brightness level. At least some of the pixels in the output or enhanced image have an output brightness level that is different from their input brightness level. Brightness level data of the input image is filtered to obtain a high frequency component of the input image in a single operational stage. The high frequency component is amplified. The original image and the amplified high frequency component are summed to produce brightness level data of the output image.

26 Claims, 4 Drawing Sheets

U.S. PATENT DOCUMENTS

| | | | | |
|---|---|---|---|---|
| 7,433,536 | B2* | 10/2008 | Kim | 382/266 |
| 7,515,747 | B2* | 4/2009 | Okutomi et al. | 382/167 |
| 7,602,447 | B2* | 10/2009 | Arici et al. | 348/687 |
| 2002/0047911 | A1* | 4/2002 | Tsuchiya et al. | 348/252 |
| 2003/0081854 | A1* | 5/2003 | Deshpande | 382/261 |
| 2005/0073702 | A1 | 4/2005 | Shaked | |

FOREIGN PATENT DOCUMENTS

| | | |
|---|---|---|
| WO | 03/100723 | 12/2003 |

OTHER PUBLICATIONS

European Search Report for Application No. EP 06 25 4054 and Annex thereto, dated Sep. 29, 2006, 4 pages.

Polesel, Andrea, et al.; Image Enhancement via Adaptive Unsharp Masking; IEEE Transactions on Image Processing, vol. 9, No. 3, Mar. 2000, pp. 505-510.

Ramponi, Giovanni, et al.; Rational Unsharp Masking Technique; Journal of Electronic Imaging, vol. 7(2), Apr. 1998, pp. 333-338.

Narendra, Patrenahalli M., et al.; Real-Time Adaptive Contrast Enhancement; IEEE Transactions on Pattern Analysis and Machine Intelligence, vol. PAMI-3, No. 6, Nov. 1981; pp. 655-661.

Polesel, A., et al.; Adaptive Unsharp Masking for Contrast Enhancement; Image Processing, 1997. Proceedings., International Conference on Santa Barbara, CA, USA Oct. 26-29, 1997, Los Alamitos, CA, USE, IEEE Comput. Soc, US, vol. 1, Oct. 26, 1997, pp. 267-270, XP010254160 ISBN.

Ramponi, Giovanni; A Cubic Unsharp Masking Technique for Contrast Enhancement; Signal Processing, 67, 1998, pp. 211-222.

Lee, Jong-Sen; Digital Image Enhancement and Noise Filtering by Use of Local Statistics; IEEE Transactions on Pattern Analysis and Machine Intelligence, vol. PAMI-2, No. 2, Mar. 1980; pp. 165-168.

* cited by examiner

| -1 | -2 | -1 |
|----|----|----|
| -2 | 1  | -2 |
| -1 | -2 | -1 |

Fig. 4

| -2  | -8 | -16 | -8 | -2  |
|-----|----|-----|----|-----|
| -8  | 2  | 16  | 2  | -8  |
| -16 | 16 | 64  | 16 | -16 |
| -8  | 2  | 16  | 2  | -8  |
| -2  | -8 | -16 | -8 | -2  |

Fig. 5

METHOD AND APPARATUS FOR ADJUSTING THE CONTRAST OF AN IMAGE

CROSS-REFERENCE TO RELATED APPLICATIONS

This application claims the benefit of priority to U.S. application Ser. No. 60/806,963, filed Jul. 11, 2006, the content of which is hereby incorporated by reference in its entirety for all purposes.

FIELD OF INVENTION

The present invention relates to a method and apparatus for adjusting the contrast of an image.

BACKGROUND

A number of techniques are known for adjusting the contrast of an image, particularly in order to improve the contrast and therefore visibility of the image and to increase depth perception. Contrast adjustment or enhancement of images, particularly digital images, is used in many fields, including enhancing the contrast of a digital image for display by a television receiver or other display device, for printing by a printer, in digital cameras, etc., etc. Contrast enhancement is used to improve the contrast in medical and other images.

Global contrast enhancement techniques remedy problems that manifest themselves in a global fashion, such as excessive or poor lighting conditions in the source environment. On the other hand, local contrast enhancement attempts to enhance the visibility of local details in the image.

A particular known local contrast enhancement method uses "unsharp masking", which is shown schematically in FIG. 1. The original image 1 is input to a smoothing filter 2, which "smoothes" the original image to remove the high frequency component so that the output of the smoothing filter 2 is the low frequency component of the original image. Then, the low frequency component of the original image is subtracted from the original image 1 in a summer 3, the output of which is therefore the high frequency component of the image. That high frequency component is then amplified by a fixed gain in a multiplier 4. The amplified high frequency component is then added back to the original image in a further summer 5, the output of which is therefore the enhanced image 6. However, this particular method amplifies the high frequency component with a fixed gain factor. This causes ringing or overshoot effects around the edges or other regions of high contrast in the original image because of the high values of the high frequency component around the edges after the amplification. In addition, this method causes noise in smooth areas of the image, which manifests itself by a grainy look in what should be smooth areas in the enhanced image. An example of this type of unsharp masking is disclosed in "Digital Image Enhancement and Noise Filtering by Using Local Statistics", IEEE Trans. Pattern Anal. Machine Intell., vol. PAMI-2, pp. 165-168, February 1980, by J. S. Lee.

Modified versions of unsharp masking are known in which the gain applied to the high frequency component of the original image by the multiplier 4 is made to vary according to certain conditions. An example is disclosed in "Real-time Adaptive Contrast Enhancement", IEEE Trans. Pattern Anal. Machine Intell., vol. PAMI-3, pp. 655-661, June 1981, by P. M. Narendra and R. C. Fitch. In the method of that paper, the gain that is used to amplify the high frequency component is made to be inversely proportional to the local variance in the high frequency component. This modified method therefore adapts the spatial gain applied to the high frequency component according to local statistics in the high frequency component. However, this causes the gain to become very large when the local variance is small, which leads to noise amplification in smooth (low contrast) areas of the input image 1. A further modification of the adaptive contrast enhancement techniques is disclosed in "Image Enhancement via Adaptive Unsharp Masking", IEEE Trans. On Image Processing, vol. 9, no. 3, March 2000, by A. Polesel, G. Ramponi and V. J. Matthews. In this modified technique, an adaptive filter is used to emphasise the medium contrast details in the image more than large contrast regions such as edges. However, the filter that is disclosed in this paper is a Laplacian filter which therefore has three tap coefficients and which is therefore computationally complex. As disclosed, the method of this paper requires 17 multiplications and one division operation to compute the output brightness level data for each pixel.

In our U.S. patent application Ser. No. 11/340,956 of 26 Jan. 2006 and related patent applications, the entire content of which is hereby incorporated by reference for all purposes, we disclose a further example of an adaptive contrast enhancement technique in which the filtering is carried out by at least one recursive infinite impulse response filter having a single delay coefficient that is adaptive to areas of high contrast in the input image. Whilst this method is computationally relatively efficient, especially when compared for example to the method disclosed by Polesel, Ramponi and Matthews, the method nevertheless requires a relatively large number of calculations to be carried out and a number of distinct steps. This makes it difficult to implement the method at low cost, which is of course of particular importance in consumer equipment, including for example television receivers or other domestic equipment having a display device.

BRIEF SUMMARY

According to a first aspect of the invention, there is provided a method of adjusting the contrast of an input image formed of pixels in which each pixel has an input brightness level to produce an output image in which at least some of the pixels have an output brightness level that is different from their input brightness level, the method comprising:

filtering brightness level data of the input image to obtain a high frequency component of the input image in a single operational stage;

amplifying the high frequency component; and, summing the original image and the amplified high frequency component to produce brightness level data of the output image.

The computation required by the preferred embodiment is relatively small owing to the fact that the high frequency component of the image is obtained using a filter in a single operational stage. The filter of the preferred embodiment is a non-adaptive filter having fixed values or coefficients. The filter may be regarded as equivalent to two filters: a first, light smoothing filter, which may be for example a Gaussian filter, and a second, strong smoothing filter, which may be for example a mean filter.

In a preferred embodiment, the filtering of the brightness level data of the input image is carried out using a filter that has a frequency response that is isotropic or close to isotropic. Isotropic filters treat frequencies in different directions equally, which in the present context helps to avoid producing false edges or objects in the enhanced image.

In a preferred embodiment, the filtering of the brightness level data of the input image is carried out using a filter that is symmetric. Symmetry, or close to symmetry, means that the filter has zero or near phase, which is preferred so as to avoid different frequency signals in the original image being shifted with varying lags.

In a preferred embodiment, the filtering of the brightness level data of the input image is carried out using a filter for which the sum of the magnitude of the diagonal filter coefficients is less than the sum of the magnitude of the horizontal filter coefficients and the magnitude of the vertical filter coefficients. This is a relaxed condition on the filter coefficients that provides for a transfer function for the filter that is close to isotropic.

In a most preferred embodiment, the filter is a symmetric 3×3 filter in which the magnitude of the edge coefficients is twice the magnitude of the corner coefficients. Preferably, the magnitude of the centre coefficient is or is approximately (4× the magnitude of each edge coefficient+4× the magnitude of each corner coefficient).

In a preferred embodiment, the filter is a high-pass filter. This is particularly suitable in the case of the filter being a 3×3 filter (i.e. one that operates in a square of pixels that is 3×3 with the central pixel in the square being the pixel that is being operated on at that particular part of the process).

In another preferred embodiment, the filter is a band-pass filter. This is particularly suitable in the case of the filter being larger than a 3×3 filter, such as a 5×5 filter.

In a preferred embodiment, the high frequency component is amplified by a gain that varies in dependence on the magnitude of the high frequency component obtained in the filtering step, and preferably varies only in dependence on the magnitude of the high frequency component obtained in the filtering step. In this way, the enhancement that is applied to the original image can be made to vary according to the local characteristics in the image and, furthermore, is computationally efficient because the output of the filter is used directly without requiring additional processing.

In a preferred embodiment, the gain is negative, zero or relatively small positive when the magnitude of the high frequency component obtained in the filtering step is below a relatively low threshold value. This region is in general associated with noise in the image. By applying a gain that is negative, zero or relatively small positive, the effect of noise can be minimised or, in the case of negative gain in particular, can be reduced.

In a preferred embodiment, the gain is positive and increases with the magnitude of the high frequency component when the magnitude of the high frequency component obtained in the filtering step is above a relatively low threshold value and below a relatively high threshold value. This region is in general associated with pixels in the background of the image and pixels of mild texture in foreground objects. A positive gain is applied for such pixels so as to obtain particularly increased levels of contrast in such regions. As the magnitude of the high frequency component increases, the likelihood of the corresponding pixel being noise decreases, and hence the gain may be safely increased with magnitude of the high frequency component.

In a preferred embodiment, the gain is positive and decreases relatively rapidly with the magnitude of the high frequency component when the magnitude of the high frequency component obtained in the filtering step is above a relatively high threshold value. This region is in general associated with edges in the image, including particularly edges of foreground objects. Given the problem of overshooting and ringing around such edges, this embodiment serves to minimise the contrast enhancement that is applied around such edges, thus reducing the risk of overshooting and ringing in the enhanced image.

In a preferred embodiment, the sum of the original image and the amplified high frequency component is subjected to saturation handling so as to adjust the output brightness level data to avoid saturation.

In a preferred embodiment, the brightness level data of the input image that is filtered in the filtering step to obtain a high frequency component of the input image in a single operational stage is obtained as the output of a noise filter, the input to the noise filter being original brightness level data of the input image. The use of such a filter can contribute to improving the noise performance of the method by smoothing the image data that is filtered in the main filtering step.

According to a second aspect of the invention, there is provided apparatus for adjusting the contrast of an input image formed of pixels in which each pixel has an input brightness level to produce an output image in which at least some of the pixels have an output brightness level that is different from their input brightness level, the apparatus comprising:

a filter constructed and arranged to filter brightness level data of an input image to obtain a high frequency component of the input image in a single operational stage;

an amplifier constructed and arranged to amplify the high frequency component; and, a summer constructed and arranged to sum the original image and the amplified high frequency component to produce brightness level data of the output image.

In a preferred embodiment, the filter has a frequency response that is isotropic or close to isotropic.

In a preferred embodiment, the filter is symmetric.

In a preferred embodiment, the sum of the magnitude of the diagonal filter coefficients of the filter is less than the sum of the magnitude of the horizontal filter coefficients and the magnitude of the vertical filter coefficients of the filter.

In a most preferred embodiment, the filter is a symmetric 3×3 filter in which the magnitude of the edge coefficients is twice the magnitude of the corner coefficients. Preferably, the magnitude of the centre coefficient is or is approximately (4× the magnitude of each edge coefficient+4× the magnitude of each corner coefficient).

In a preferred embodiment, the filter is a high-pass filter.

In a preferred embodiment, the filter is a band-pass filter.

In a preferred embodiment, the amplifier is constructed and arranged so that the gain by which the high frequency component is amplified varies in dependence on the magnitude of the high frequency component output by the filter.

In a preferred embodiment, the amplifier is constructed and arranged so that the gain is negative, zero or relatively small positive when the magnitude of the high frequency component obtained in the filtering step is below a relatively low threshold value.

In a preferred embodiment, the amplifier is constructed and arranged so that the gain is positive and increases with the magnitude of the high frequency component when the magnitude of the high frequency component obtained in the filtering step is above a relatively low threshold value and below a relatively high threshold value.

In a preferred embodiment, the amplifier is constructed and arranged so that the gain is positive and decreases relatively rapidly with the magnitude of the high frequency component when the magnitude of the high frequency component obtained in the filtering step is above a relatively high threshold value.

In a preferred embodiment, the apparatus comprises a saturation handler constructed and arranged to subject the sum of the original image and the amplified high frequency component to saturation handling so as to adjust the output brightness level data to avoid saturation.

In a preferred embodiment, the apparatus comprises a noise filter constructed and arranged to receive original brightness level data of the input image as an input and to output the brightness level data of the input image that is filtered by the filter that outputs the high frequency component of the input image.

The preferred apparatus and/or method may be incorporated into any apparatus and/or method that is used to enhance the contrast of a digital image, including for example an image processor used in a television set or the like, printers, digital cameras, television broadcast capture cards, digital image processing software which may be used in many applications, etc., etc. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the invention will now be described by way of example with reference to the accompanying drawings, in which:

FIG. 2 shows schematically an overview of an example of a method according to the invention;

FIGS. 3 to 5 show examples of high-pass filters and a band-pass filter suitable for use as the filter that filters brightness level data of the input image to obtain the high frequency component of the input image; and, FIG. 6 shows graphically examples of the variation of gain that may be applied in dependence on the output of the filter that filters brightness level data of the input image to obtain the high frequency component of the input image.

BRIEF DESCRIPTION OF PREFERRED EMBODIMENTS

Figure 1:
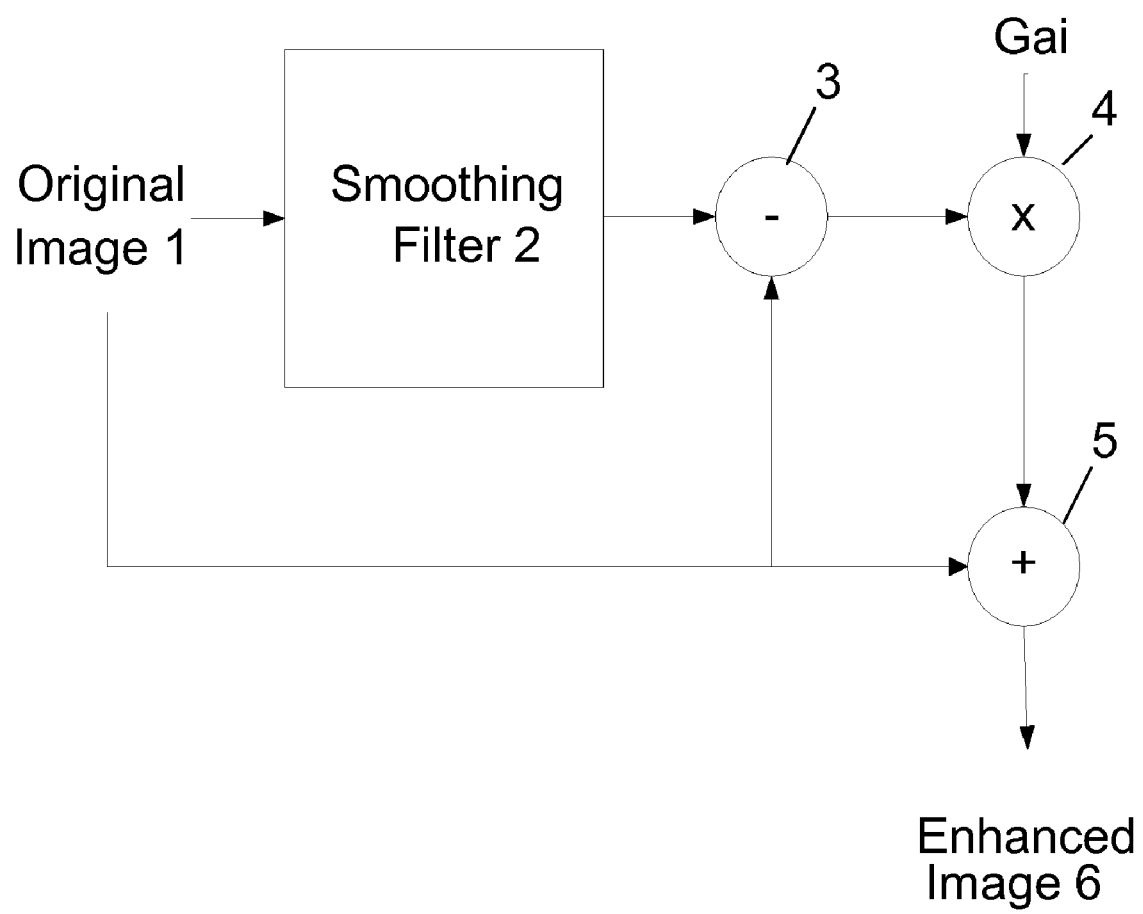
FIG. 1 shows schematically a prior art method of contrast enhancement.
Figures 2, 3:
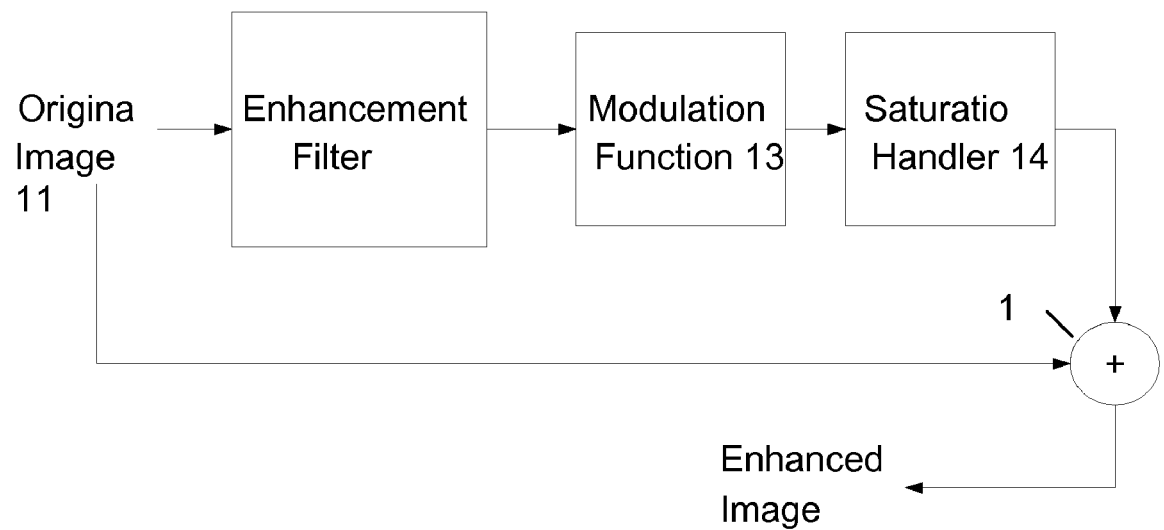

Referring to FIG. 2, which shows schematically an overview of an example of a method according to the invention, an original input image 11 is filtered by an enhancement filter 12. As will be explained further below, the enhancement filter 12 is a fixed, non-adaptive filter, i.e. the filter has fixed coefficients that do not change, and operates to output the high frequency component of the original image 11 in a single operational stage.

The output of the enhancement filter 12 is passed to a modulation function 13, which applies a gain g to the output of the enhancement filter 12. The nature of the preferred gain g will be discussed further below.

The output of the modulation function 13 is then passed to a saturation handler 14 which operates to avoid saturation of contrast in the enhanced image, again as will be discussed further below.

Then, the output of the saturation handler 14 is added back to the original image 11 in a summer 15 to obtain the enhanced image 16. The operation of the preferred saturation handler 14 will be discussed further below.

The preferred enhancement filter 12 has an isotropic frequency response, i.e. it treats frequencies in different directions equally. This helps to avoid creating false objects, such as false edges 16, in the enhanced image 16.

The filter mask size of the enhancement filter 12 can in general be m*n, where m is less than the number of picture lines in the image and n is less than the number of columns. For 3×3 filter masks, the enhancement filter 12 is preferably a high-pass filter.

FIG. 3 shows a general 3×3 high pass filter that is symmetric with respect to the two diagonals and the two centrelines. This symmetry means that the filter has zero phase, which is preferred so as to avoid different frequency signals in the original image being shifted with varying lags. Row-wise from the top, the filter coefficients are:

$$[\{-a/4,-b/4,-a/4\}; \{-b/4,a+b,-b/4\}; \{-a/4,-b/4,-a/4\}]$$

Given the symmetry and therefore the zero phase, the corresponding transfer function is:

$$H[u,v]=a+b-b(\cos(u))/2-b(\cos(v))/2-a(\cos(u-v))/2-a(\cos(u+v))/2$$

To achieve isotropy, an equality condition can be imposed on this transfer function so that the gain is equal for the horizontal/vertical and diagonal directions (i.e. $H[\pm\pi, \pm\pi]=H[\pm\pi, 0]=H[0, \pm\pi]$. Since $H[u,v]$ is even and symmetric, all equalities reveal the same relationship for a and b, as follows:

$$H[\pi,\pi]=H[\pi,0]$$

$$a+b+b/2+b/2-a/2-a/2=a+b+b/2-b/2+a/2+a/2$$

which becomes:

$$b=2a$$

This is an important finding and shows the optimum relationship between the coefficients for a high pass filter for use in the present context, i.e. a high pass filter that is symmetric and isotropic. In practice, the actual coefficients may be varied somewhat from this optimum relationship. For example, a more relaxed condition that still produces good results is for the sum of the magnitude of the diagonal filter coefficients (e.g. those at the corners of a 3×3 filter) to be less than the sum of the magnitude of the horizontal filter coefficients and the magnitude of the vertical filter coefficients (e.g. those at the edges of a 3×3 filter) (i.e. the sum of the magnitude of the diagonal filter coefficients is less than the sum: the magnitude of the horizontal filter coefficients plus the magnitude of the vertical filter coefficients). In FIG. 4 there is shown a specific example that perfectly meets the requirement derived from the general case of FIG. 3.

For larger filter masks, band-pass filters can be used. An example of a suitable band-pass filter 12 is shown in FIG. 5.

It will be understood that the examples of filter masks shown in FIGS. 3 to 5 are examples only and that scaled versions of these, or in general masks having different relative values altogether, may be used. In either case, i.e. for band-pass or high-pass filters, or indeed any other suitable filter used as the enhancement filter 12, by adjusting the taps carefully and analyzing the frequency response, other isotropic filters can also be designed.

The enhancement filter 12 may be regarded as equivalent to the difference of two smoothing filters: the first being a strong smoothing filter and the second being a light smoothing filter. Indeed, the enhancement filter 12 may actually be implemented by two separate filters, namely a strong smoothing filter and a light smoothing filter, each of which operates on the input original image data. The light smoothing filter may be a Gaussian filter, which in general again may be of size m*n discussed above. The strong filter may be a mean filter, which in general again may be of size m*n discussed above though must of course be the same size as the light smoothing filter. The difference of these two filters is then obtained as the output of the enhancement filter 12.

The gain g that is applied by the modulation function 13 to the output of the enhancement filter 12 is preferably varied depending on the value of the output of the enhancement filter 12 at each pixel, and preferably only on the value of the output of the enhancement filter 12 at each pixel. In a preferred embodiment, the modulation function 13 uses the output of the enhancement filter 12 to classify the original pixels into one of three different types. The value of g at any particular value of the output of the enhancement filter 12 may be stored in a look-up table.

Figure 6:
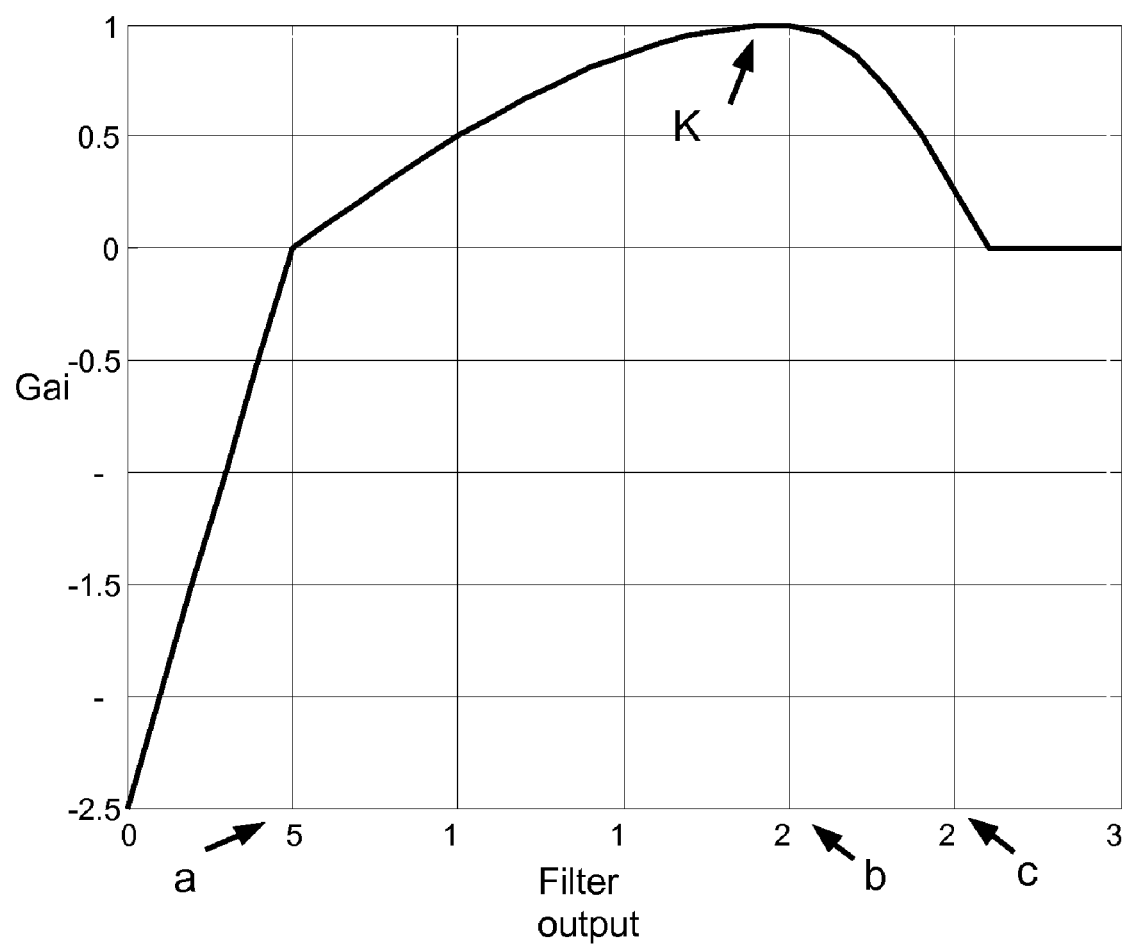

The first type corresponds to noise and corresponds to small outputs from the enhancement filter 12. Referring to FIG. 6, for outputs from the enhancement filter 12 that are below a certain lower threshold "a", the gain g is preferably negative, zero or small positive and preferably decreases monotonically with decreasing value of the output from the enhancement filter 12. It will be understood that when the gain g is negative, the enhanced image is the original image minus the high-frequency image. In such a case, therefore, instead of enhancing the high-frequencies, the original image is smoothened. This improves the visual quality of the smooth regions and thus a negative gain in this region is most preferred. In this region, the gain g may vary linearly with the value of the output from the enhancement filter 12. For outputs from the enhancement filter 12 that are less than "a", the gain can be for example a minimum of −2.5. In one embodiment, "a" is equal to or less than 5.

The second type corresponds to detail in the original image and corresponds to outputs from the enhancement filter 12 that are in a "mid band", i.e. between the first threshold "a" and a second, higher threshold "b". In this region, the gain may be increased as the likelihood of noise decreases, i.e. as the output from the enhancement filter 12 increases, and thus in this region the gain g preferably increases monotonically with the output from the enhancement filter 12. One such gain can be computed from a sine function evaluated at the first quadrant. However, other functions may be used and, indeed, the gain g may be constant in this region. Typical values for "b" are in range 10 to 20.

The third type corresponds to high luminance transitions and corresponds to outputs from the enhancement filter 12 that are above the second threshold "b". For these larger outputs from the enhancement filter 12, the gain g quickly decreases to zero in order to avoid any overshoots. In this case, the gain g decreases to zero at a third, highest threshold "c" and remains at zero thereafter. One such gain in the region between "b" and "c" can be computed from a cosine evaluated at its first quadrant. However, other functions may be used and, for example, the gain g may decrease linearly with the value of the output from the enhancement filter 12 in this region. Typical values for "c" are in the range 25 to 30.

The pseudo code for this particular example is:

```
if (dev <= a)
    gain = -2 + 2/(a-1)*(dev-1);
    %gain = 0;
elseif (dev < b)
    gain = K*sin(pi/2*(dev-a)/(b-a));
elseif (dev <c)
```

-continued

```
    gain = K*cos(pi/2*(dev-b)/(c-b));
else
    gain=0;
end
return;
``` where K is the user-selected maximum gain.

The saturation handler 14 modifies the modulated filter output when the original pixel value is close to minimum or maximum luminance values in order to avoid saturation of the enhanced image at low or high luminance values. In one preferred embodiment, two saturation levels are defined: a minimum and a maximum saturation level. When the original pixel value is smaller than the minimum saturation level or larger than the maximum saturation level, the magnitude of the modulated output of the enhancement filter 12 from the modulation function 13 is decreased. The amount of decrease may be in proportion to the amount that the original pixel value differs from the minimum or maximum saturation level respectively. Below is the pseudo code for the saturation handling in one specific implementation, in this case assuming that there are 255 grey levels available in the display device that will display the enhanced image:

```
Diff1=MinSL-Y(m,n);
if(Diff1>0)
    YY=Y+FilterOutput*[1-(Diff1/MinSL)]^roll;
End
Diff2=Y-MaxSL
if (Diff2>0)
    YY=Y+FilterOutput*[1-(Diff2/(255-MaxSL))]^roll;
end,
``` where Y is the original luminance value, YY is the enhanced luminance value, MinSL is the minimum saturation level, MaxSL is the maximum saturation level and roll is any integer, typically 1.

The original image 11 may be filtered by a noise filter (not shown) prior to the brightness level data of the input image being passed to the enhancement filter 12. An example of a suitable filter is a Wiener filter. In general, the noise filter may be a m*n where m is less than the number of picture lines in the image and n is less than the number of columns. In an example, the noise filter is a 3×3 filter. When such a noise filter operates, the brightness level data of the input image is smoothed which improves the noise performance of the apparatus and method.

Embodiments of the invention have been described with particular reference to the examples illustrated. However, it will be appreciated that variations and modifications may be made to the examples described within the scope of the invention.

The invention claimed is:

1. A method of adjusting the contrast of an input image formed of pixels in which each pixel has an input brightness level to produce an output image in which at least some of the pixels have an output brightness level that is different from their input brightness level, the method comprising:
    filtering brightness level data of the input image to obtain a high frequency component of the input image in a single operational stage using a non-adaptive filter having fixed coefficients and a frequency response that is isotropic;
    amplifying the high frequency component; and, summing the input image and the amplified high frequency component to produce brightness level data of the output image.

2. A method according to claim 1, wherein the filtering of the brightness level data of the input image is carried out using a filter that is symmetric.

3. A method according to claim 1, wherein the filter is a high-pass filter.

4. A method according to claim 1, wherein the filter is a band-pass filter.

5. A method according to claim 1, wherein the high frequency component is amplified by a gain that varies only in dependence on the magnitude of the high frequency component obtained in the filtering step.

6. A method according to claim 5, wherein the gain is negative, zero or relatively small positive when the magnitude of the high frequency component obtained in the filtering step is below a relatively low threshold value.

7. A method according to claim 5, wherein the gain is positive and increases with the magnitude of the high frequency component when the magnitude of the high frequency component obtained in the filtering step is above a relatively low threshold value and below a relatively high threshold value.

8. A method according to claim 5, wherein the gain is positive and decreases relatively rapidly with the magnitude of the high frequency component when the magnitude of the high frequency component obtained in the filtering step is above a relatively high threshold value.

9. A method according to claim 1, wherein the sum of the input image and the amplified high frequency component is subjected to saturation handling so as to adjust the output brightness level data to avoid saturation.

10. A method according to claim 1, wherein the brightness level data of the input image that is filtered in the filtering step to obtain a high frequency component of the input image in a single operational stage is obtained as the output of a noise filter, the input to the noise filter being original brightness level data of the input image.

11. A method of adjusting the contrast of an input image formed of pixels in which each pixel has an input brightness level to produce an output image in which at least some of the pixels have an output brightness level that is different from their input brightness level, the method comprising:
filtering brightness level data of the input image to obtain a high frequency component of the input image in a single operational stage using a non-adaptive filter having fixed coefficients and a frequency response that is isotropic or close to isotropic;
amplifying the high frequency component; and,
summing the input image and the amplified high frequency component to produce brightness level data of the output image,
wherein the filtering of the brightness level data of the input image is carried out using a filter for which the sum of the magnitude of the diagonal filter coefficients is less than the sum of the magnitude of the horizontal filter coefficients and the magnitude of the vertical filter coefficients.

12. A method of adjusting the contrast of an input image formed of pixels in which each pixel has an input brightness level to produce an output image in which at least some of the pixels have an output brightness level that is different from their input brightness level, the method comprising:
filtering brightness level data of the input image to obtain a high frequency component of the input image in a single operational stage using a non-adaptive filter having fixed coefficients and a frequency response that is isotropic;
amplifying the high frequency component; and,
summing the input image and the amplified high frequency component to produce brightness level data of the output image,
wherein the filter is a symmetric 3×3 filter in which the magnitude of the edge coefficients is twice the magnitude of the corner coefficients.

13. A method according to claim 12, wherein the magnitude of the centre coefficient is equal to or is approximately equal to the sum of (a) four times the magnitude of each edge coefficient and (b) four times the magnitude of each corner coefficient.

14. Apparatus for adjusting the contrast of an input image formed of pixels in which each pixel has an input brightness level to produce an output image in which at least some of the pixels have an output brightness level that is different from their input brightness level, the apparatus comprising:
a non-adaptive filter having fixed coefficients constructed and arranged to filter brightness level data of an input image to obtain a high frequency component of the input image in a single operational stage, wherein the filter has a frequency response that is isotropic;
an amplifier constructed and arranged to amplify the high frequency component; and,
a summer constructed and arranged to sum the input image and the amplified high frequency component to produce brightness level data of the output image.

15. Apparatus according to claim 14, wherein the filter is symmetric.

16. Apparatus according to claim 14, wherein the filter is a high-pass filter.

17. Apparatus according to claim 14, wherein the filter is a band-pass filter.

18. Apparatus according to claim 14, wherein the amplifier is constructed and arranged so that the gain by which the high frequency component is amplified varies only in dependence on the magnitude of the high frequency component output by the filter.

19. An apparatus according to claim 18, wherein the amplifier is constructed and arranged so that the gain is negative, zero or relatively small positive when the magnitude of the high frequency component obtained in the filtering step is below a relatively low threshold value.

20. Apparatus according to claim 18, wherein the amplifier is constructed and arranged so that the gain is positive and increases with the magnitude of the high frequency component when the magnitude of the high frequency component obtained in the filtering step is above a relatively low threshold value and below a relatively high threshold value.

21. Apparatus according to claim 18, wherein the amplifier is constructed and arranged so that the gain is positive and decreases relatively rapidly with the magnitude of the high frequency component when the magnitude of the high frequency component obtained in the filtering step is above a relatively high threshold value.

22. Apparatus according to claim 14, comprising a saturation handler constructed and arranged to subject the sum of the input image and the amplified high frequency component to saturation handling so as to adjust the output brightness level data to avoid saturation.

23. Apparatus according to claim 14, comprising a noise filter constructed and arranged to receive original brightness level data of the input image as an input and to output the brightness level data of the input image that is filtered by the filter that outputs the high frequency component of the input image.

24. Apparatus for adjusting the contrast of an input image formed of pixels in which each pixel has an input brightness level to produce an output image in which at least some of the pixels have an output brightness level that is different from their input brightness level, the apparatus comprising:
- a non-adaptive filter having fixed coefficients constructed and arranged to filter brightness level data of an input image to obtain a high frequency component of the input image in a single operational stage, wherein the filter has a frequency response that is isotropic;
- an amplifier constructed and arranged to amplify the high frequency component; and,
- a summer constructed and arranged to sum the input image and the amplified high frequency component to produce brightness level data of the output image,
- wherein the sum of the magnitude of the diagonal filter coefficients of the filter is less than the sum of the magnitude of the horizontal filter coefficients and the magnitude of the vertical filter coefficients of the filter.

25. Apparatus for adjusting the contrast of an input image formed of pixels in which each pixel has an input brightness level to produce an output image in which at least some of the pixels have an output brightness level that is different from their input brightness level, the apparatus comprising:
- a non-adaptive filter having fixed coefficients constructed and arranged to filter brightness level data of an input image to obtain a high frequency component of the input image in a single operational stage, wherein the filter has a frequency response that is isotropic;
- an amplifier constructed and arranged to amplify the high frequency component; and,
- a summer constructed and arranged to sum the input image and the amplified high frequency component to produce brightness level data of the output image,
- wherein the filter is a symmetric 3×3 filter in which the magnitude of the edge coefficients is twice the magnitude of the corner coefficients.

26. An apparatus according to claim 25, wherein the magnitude of the centre coefficient is equal to or is approximately equal to (a) four times the magnitude of each edge coefficient plus (b) four times the magnitude of each corner coefficient.

* * * * *